US006272865B1

United States Patent
Clark et al.

(10) Patent No.: US 6,272,865 B1
(45) Date of Patent: Aug. 14, 2001

(54) SWIRLER SCOOP AND BEARING PLATE FOR COMBUSTOR

(75) Inventors: Jim A. Clark, Jupiter, FL (US); Todd M. Neill, Shingle Spring, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/303,072

(22) Filed: Apr. 30, 1999

(51) Int. Cl.[7] ........................................ F02C 1/00
(52) U.S. Cl. ................................................ 60/748
(58) Field of Search ........................................ 60/748

(56) References Cited

U.S. PATENT DOCUMENTS 3,915,387 * 10/1975 Caruel et al. ........................ 239/400
5,465,571 * 11/1995 Clark ................................. 60/39.32
5,934,067 * 8/1999 Ansart et al. ...................... 60/39.36

* cited by examiner

Primary Examiner—Charles G. Freay
(74) Attorney, Agent, or Firm—Norman Friedland

(57) ABSTRACT

The effectiveness of a radial inlet air swirler for the fuel nozzle in the combustor of a gas turbine engine is enhanced by reducing the pressure loss associated with compressor discharge air as it enters the combustor cowl. A circumferential uniform feed pressure is created by an aerodynamically contoured projection on the pressure plate supporting the fuel nozzle and a cooperating dynamic swirler scoop at the inlet of the swirler. The increased flow and fuel/air mixing reduces smoke production without adversely affecting combustor or engine performance.

9 Claims, 3 Drawing Sheets

SWIRLER SCOOP AND BEARING PLATE FOR COMBUSTOR

TECHNICAL FIELD

This invention relates to combustors and more particularly to the configuration of the air inlet that is usable with radial-inflow air swirlers for the fuel nozzle utilized in combustors of turbine types of power plants.

BACKGROUND OF THE INVENTION

As is well known to one skilled in the field of aeronautics, there are constraints as to the emissions from aircraft turbine power plants. For example, the United States Government imposes restrictions on the noxious fumes and smoke that are emitted from the engine. Obviously, there is an on-going effort from scientists and engineers to lower the levels of smoke and noxious constituents release in the combustion process. Needless to say it is imperative that the reduction of the smoke levels cannot adversely impact the efficiency of the engine. Hence, to effectuate reduction of smoke it is necessary to increase combustor swirler airflow without sacrificing diffuser stability and performance which would otherwise impact the efficaciousness of the engine. Additionally, as one skilled in this art appreciates, it is abundantly important that the pressure drop across these swirlers are maintained at a minimum as this has an impact on cycle energy and the higher the pressure drop the greater the deficit. Obviously, the designer is confronted with the problem of needing to increase the airflow through the swirlers while at the same time to maintain a specified pressure drop. While this suggests increasing the opening of the swirler to maximize the flow of air, a simple increase in flow area reduces the velocity of the air, thereby adversely affecting fuel atomization and fuel-air mixing in the primary zone of the combustor.

For a good understanding of this invention it is believed that an understanding of the problem would be of some value. As mentioned in the earlier paragraphs, there is a need to increase combustor swirler airflow without sacrificing diffuser stability and performance. As is appreciated by those skilled in this technology, typical current day designs of the swirlers that are utilized by the fuel nozzle are high shear swirler systems that rely on being fed from the cowl of the combustor which receives air from the compressor. At the swirler inlet, the pressure of the swirler-feed air is cowl static pressure, rather than the higher, total pressure of the cowl-entry air, because the swirler inlet is perpendicular to the cowl-entry flow. The high dynamic head in the cowl inlet-flow is lost primarily because very little diffusion of the cowl flow occurs between the cowl opening and the swirler inlet. By performing flow visualization tests in a sector cowl flow rig, it could be seen that the high velocity air entering the cowl stagnates on the swirler bearing plate and dome between swirlers. These visualizations and pressure measurements indicate that a significantly depressed swirler feed pressure in the area of the adjacent swirler just downstream of the cowl inlet as compared to the feed pressure in the area away from the cowl inlet, which is cowl static pressure fed. This depressed swirler feed pressure in combination with the pressure loss of the cowl flow stagnating on the bearing plate lead to reduced cowl pressure recovery, and consequently reduced swirler airflow.

We have found that we can provide an aerodynamically efficient solution to the problems stated above by incorporating a bearing plate that is mounted on the fore end of the fuel nozzle and contoured to provide an aerodynamically smooth flow to a scoop mounted on the fore end and at the inlet of the radial air swirler. The combined bearing plate and scoop serve to define an aerodynamically clean passage for leading an increased amount of air flow into the inlets of the swirler with a consequential reduction in smoke promotion without sacrificing diffuser stability and without increasing the overall combustor pressure drop. By virtue of this invention, the swirler airflow is increased and tests have confirmed that as much as a 2.5% increase has been realized with the additional benefit of providing a circumferentially uniform swirler feed pressure. One important aspect of this invention is that the benefits described above can be obtained with a small modification to existing swirler and fuel nozzles. The existing swirler casting can be modified to include the scoop configuration and the bearing plate can easily be configured to include the aerodynamic design of this invention.

SUMMARY OF THE INVENTION

An object of this invention is to provide an improved airflow swirler system for the fuel nozzle of the combustor of the gas turbine engine.

A feature of this invention is the inclusion of a dynamic swirler scoop and aerodynamic bearing plate that streamlines the flow of air into the radial inlet swirlers.

Another feature of this invention is the dynamic swirler scoop is made integral with the existing swirler casting and the aerodynamic bearing plate is a modification of the existing bearing plate.

The invention is characterized by the enhanced swirler efficiency and the circumferentially uniform swirler feed pressure for reduced smoke levels without adversely affecting engine performance and modifying existing hardware for a obtaining a relatively inexpensive and highly reliable and improved air flow system.

The foregoing and other features of the present invention will become more apparent from the following description and accompanying drawings.

DETAILED DESCRIPTION OF THE INVENTION

Figure 1:
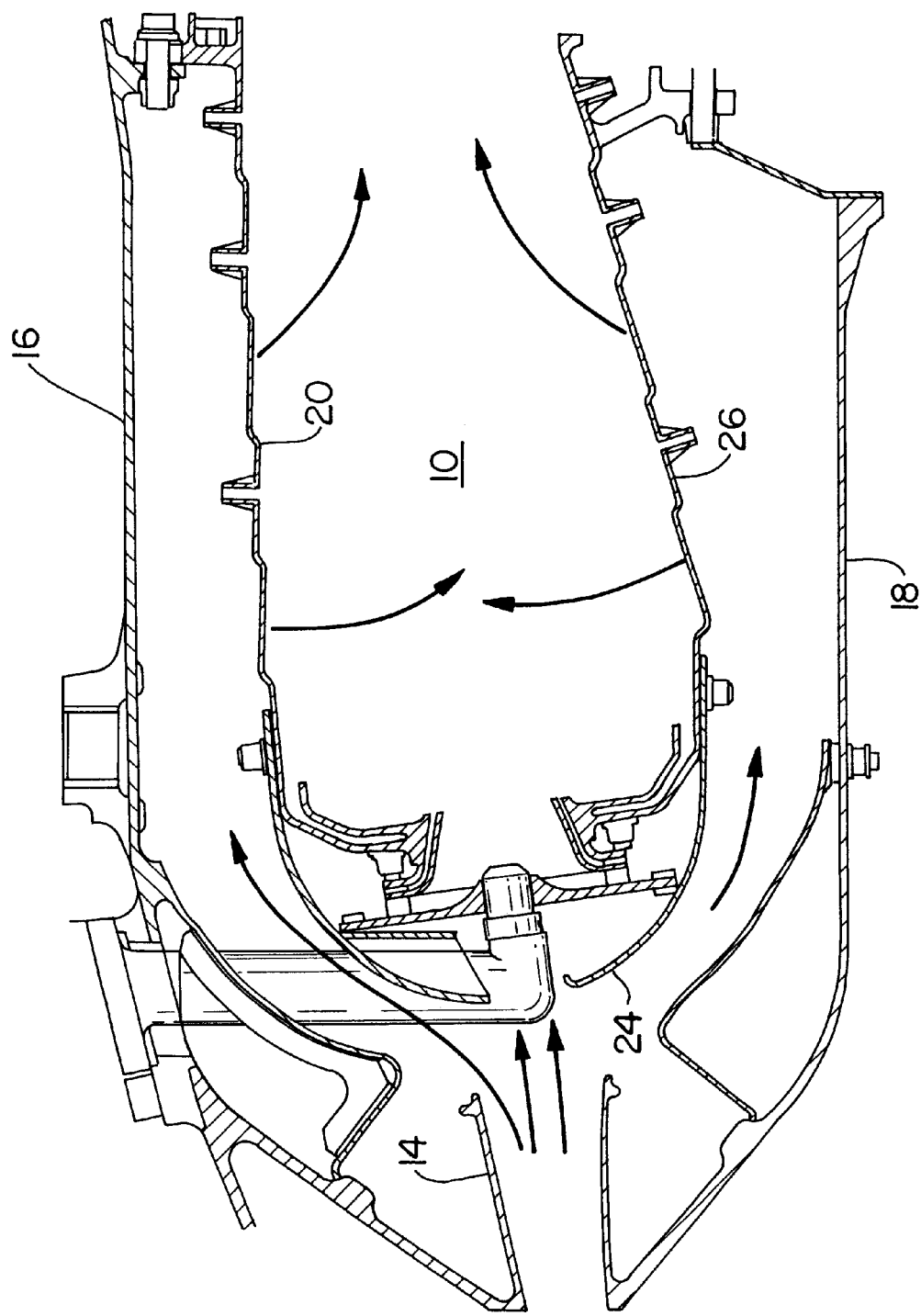
FIG. 1 is a schematic illustration of a prior art annular combustor for a gas turbine engine.

While in its preferred embodiment this invention is being described with a particular annular combustor, it is to be understood that this invention has utility with other types of combustor. Of significance is that the combustor includes a dome and air inlets at the dome and fuel nozzles mounted in the front end of the combustor and the fuel nozzles incorporate radial inflow swirlers. As shown in FIG. 1 which is a generalization of an annular combustor generally indicated by reference numeral 10 mounted in the combustor case 12 which includes a prediffuser 14 for receiving air from the compressor of the gas turbine engine (not shown). As is typical in annular burners the combustor case 12 includes an outer annular case 16 and an inner annular case 18 that surrounds the main central shaft (not shown) of the engine. Concentrically mounted in the space between the outer annular case 16 and inner annular case 18 are the outer combustor liner 20 and inner combustor liner 22 and the inner space therebetween defines the combustion chamber of the combustor 10. The forward end of combustor 10 is closed by a dome 24 mounted on the front end of the outer liner 20 and inner liner 22. A fuel nozzle 26 extending through an opening in the engine's case extends into the inner cavity of the dome and is supported on the front end of the combustor 10 in a well known manner. For further details of gas turbine engine combustors and fuel nozzles reference should be made to U.S. Pat. No. 5,297,385 granted to Dubell et al on Mar. 29, 1994 entitled "Combustor" and U.S. Pat. No. 5,353,599 granted to Johnson et al on Oct. 11, 1994 entitled "Fuel Nozzle Swirler For Combustors" both of which are commonly assigned to the assignee of this patent application and which are incorporated herein by reference. Suffice it to say that the swirler is mounted in the front end of the combustor and is surrounded by the cowl or portion of the combustion liner and the swirlers are of the radial inflow type.

Figure 2:
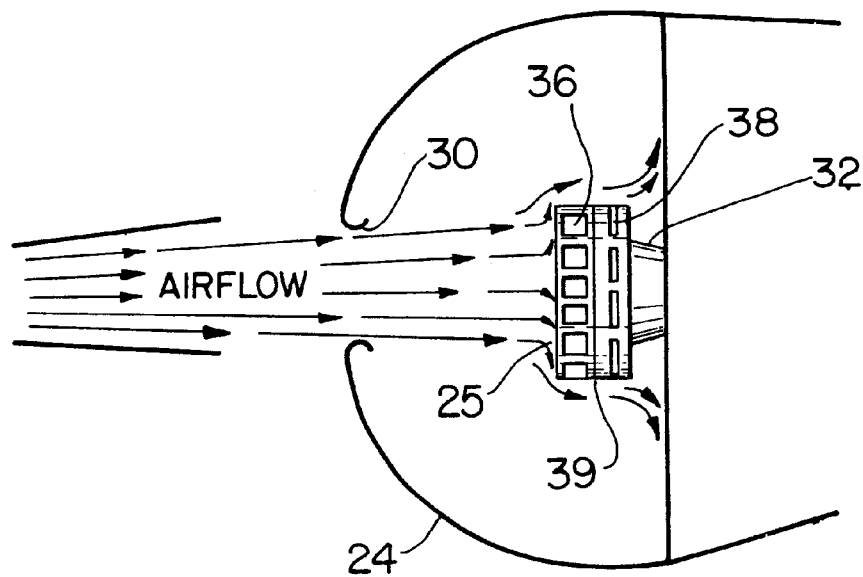
FIG. 2 is a schematic illustration of the prior art combustor of the type depicted in FIG. 1 showing the flow pattern of the airflow exiting the combustor into the prediffuser prior to flowing into the swirler.
Figure 3:
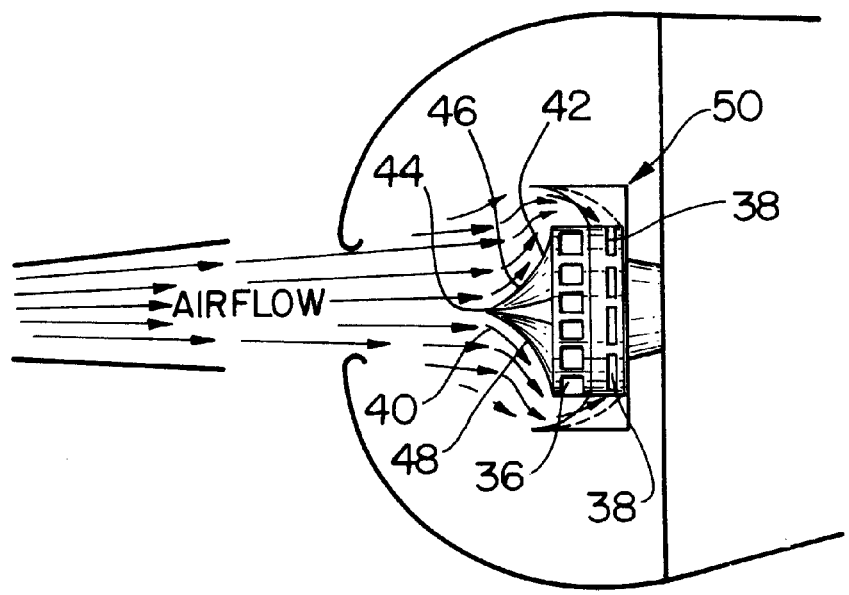
FIG. 3 is a schematic illustration of the flow system depicted in FIG. 2 with the inclusion of this invention.

As best seen in FIG. 2 which is a schematic representation of the structure disclosed in Pat. No. 5,353,599, supra, the air discharging from the prediffuser 14 (duplicate elements are identified by the same reference numeral in all of the FIGS.) is admitted into the cowl 24 axially spaced therefrom, noting that a portion of the air flows along the outer and inner liner walls and a portion of this air is admitted into the combustor for diffusing and cooling purposes in the combustion chamber. As noted the air flowing into the opening 30 in the front end of the cowl 24 impinges on the front face 25 of the swirler 32. A portion of this air is admitted into the swirler 32 though the circumferentially spaced openings 36 and 38 there being two swirl passages in swirler 32 of the type disclosed in the U.S. Pat. No. 5,353,599, supra.

Figure 4:
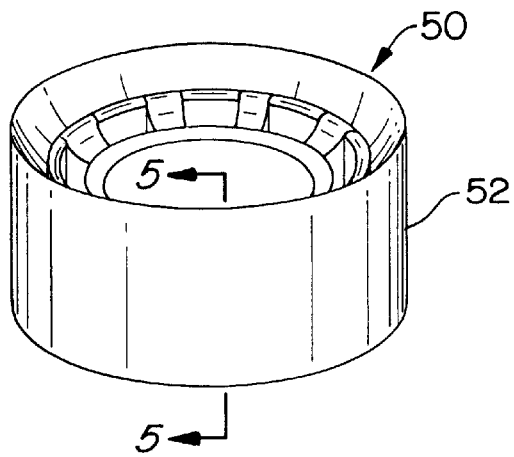
FIG. 4 is a perspective view of the dynamic swirler scoop of this invention.
Figure 5:
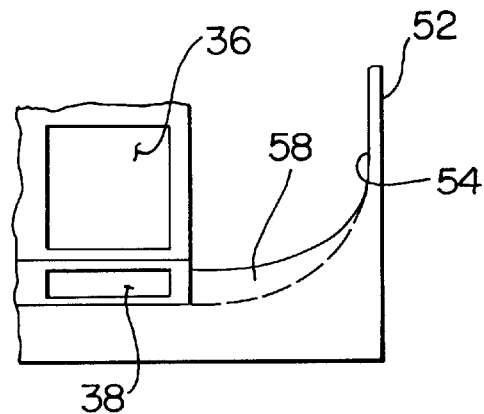
FIG. 5 is a partial sectional view taken from lines 5—5 of FIG. 5 showing schematically the details of this invention.
Figure 6:
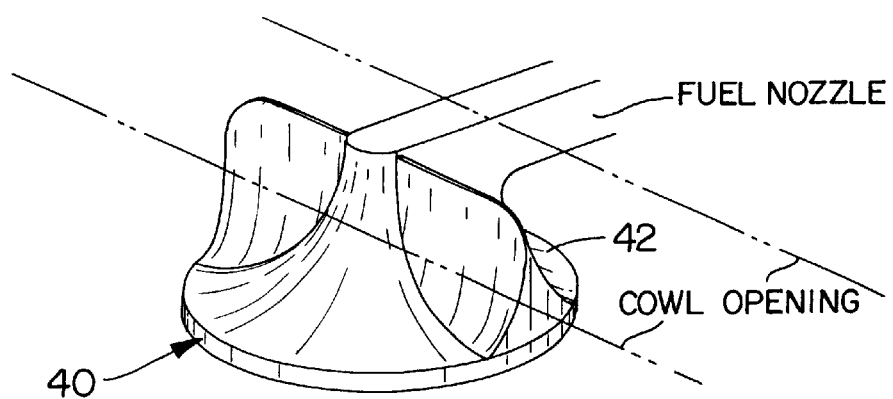
FIG. 6 is a partial view of the bearing plate configured with the aerodynamic design of this invention.

In accordance to this invention and as best seen in FIGS. 3 through 6, the bearing plate 38 which is conventional hardware on this type of combustor is modified to include the forward end portion 40 that is configured into a triangular shaped projection 42 with the apex 44 facing the airflow. The member 42 includes the upper face 46 and lower face 48 that flares from the apex to the front face 25 of the swirler 32 and is slightly concave (but could be convex) to define an aerodynamically smooth surface to direct the airflow to the scoop 50 mounted on the radial face of the swirler. FIGS. 4 and 5 provide a clearer view of the dynamic swirler scoop 50 and FIG. 6 provides a clearer view of the aerodynamic bearing plate 40.

As best seen in FIG. 4, added to the swirler 32 is the scoop 50 which comprises a cylindrical outer shell 52 that is contoured on the inner diameter of the inner wall 54 and flares radially inward toward the radial inlets 36 and 38 to direct the air into the inlets 36 and 38. The bottom surface 58 is contoured to define the inner diameter vane 60 and outer diameter vane 62 where the inner diameter vane directs the air into the inlet 36 and the outer diameter vane directs the air into the inlet 38.

As seen in FIG. 6 the bearing plate 40 which is modified to include the forward projection 42 that is contoured into the generally triangular shaped member having the upper contoured face 46 and the lower contoured face 48 and is extended to the other side of the fuel nozzle (not shown).

What has been shown by this invention is a dynamic swirler scoop and an aerodynamic bearing plate that is configured to cooperate with each other to define a smooth aerodynamically efficient flow path from the inlet of the combustor to the swirler. This improves on the characteristics of the air flowing into the swirler by minimizing pressure loss and maintaining a circumferentially uniform swirler feed pressure. Not only does this improve swirler efficiency it also enhances the mixing between the air and fuel being injected therein by the fuel nozzle. The invention is characterized by the fact that the scoop and aerodynamic projection on the bearing plate can easily be added to the existing swirler and bearing plate. This provides a relatively inexpensive structure that affords an important improvement to the combustor by reducing the level of smoke while not adversely affecting the performance of the engine. The increased weight of the components is well compensated by the advantages and benefits provided by this invention.

Although this invention has been shown and described with respect to detailed embodiments thereof, it will be appreciated and understood by those skilled in the art that various changes in form and detail thereof may be made without departing from the spirit and scope of the claimed invention.

We claim:

1. A combustor for a gas turbine engine having a radial air inlet swirler with a fuel nozzle including a fuel injector wherein the improvement comprises, a pressure plate having a fore end and an aft end supporting the fuel nozzle and radial air inlet swirler, a projection mounted on the fore end of the pressure plate and being aerodynamically shaped and a scoop cooperating with said projection for feeding air into the inlet of said radial air inlet swirler.

2. A combustor as claimed in claim 1 wherein said projection includes a triangularly shaped member having an apex spaced from said pressure plate and flaring toward the base of said triangular shaped member for causing air flow impinging on said projection to flow toward the inlet of said radial-inlet air swirler.

3. A combustor as claimed in claim 2 wherein said flared portion is concave or convex in shape.

4. A combustor as claimed in claim 1 wherein said scoop is mounted on the swirler in proximity to the inlet of said radial inlet air swirler, said scoop having a cylindrically shaped outer shell and a contoured vane having an inner diameter vane portion flaring radially from the inner surface of said shell toward said swirler for feeding air into said inlet of said radial inlet air swirler.

5. A combustor as claimed in claim 4 wherein said radial inlet air swirler includes a first bank of circumferentially spaced radial air inlets and a second bank of circumferentially space radial air inlets axially spaced from said first bank, wherein said contour vane also includes an outer diameter vane portion for feeding said first bank of air inlets and said second bank of air inlets.

6. An air feed system for the radial-inlet air swirler for the fuel nozzle for the combustor of a gas turbine engine having a pressure plate supporting the fuel nozzle and a radial-inlet air swirler, the improvement comprising a projection mounted on the fore end of the pressure plate and being aerodynamically shaped and a scoop cooperating with said projection for feeding air into the inlet of said radial-inlet air swirler, said scoop mounted on the swirler in proximity to the inlet of said radial-inlet air swirler, said scoop having a cylindrically shaped outer shell and a contoured vane having an inner vane portion flaring radially from the inner surface of said shell toward said swirler for feeding air into said inlet of said swirler, whereby said aerodynamically shaped projection feeds air to said scoop for maximizing the pressure of the air entering the inlet of said radial inlet swirler.

7. An air feed system for the radial-inlet air swirler for the fuel nozzle for the combustor of a gas turbine engine as claimed in 6 wherein said radial-inlet air swirler includes a first bank of circumferentially spaced radial air inlets and a second bank of circumferentially space radial air inlets axially spaced from said first bank, wherein said contour vane includes an inner diameter vane portion and an outer diameter vane portion for feeding said first bank of air inlets and said second bank of air inlets.

8. An air feed system for the radial-inlet air swirler for the fuel nozzle for the combustor of a gas turbine engine as claimed in 7 wherein said projection includes a triangularly shaped member having an apex spaced from said pressure plate and flaring toward the base of said triangular shaped member for causing air flow impinging on said projection to flow toward the inlet of said radial-inlet air swirler.

9. An air feed system for the radial-inlet air swirler for the fuel nozzle for the combustor of a gas turbine engine as claimed in 8 wherein said flared portion is concave or convex in shape.

* * * * *